No. 832,946. PATENTED OCT. 9, 1906.
C. A. ANDERSON & W. HAGSTROM.
AUTOMATIC RELEASE FOR PARTY LINE EXCHANGES.
APPLICATION FILED FEB. 8, 1905.
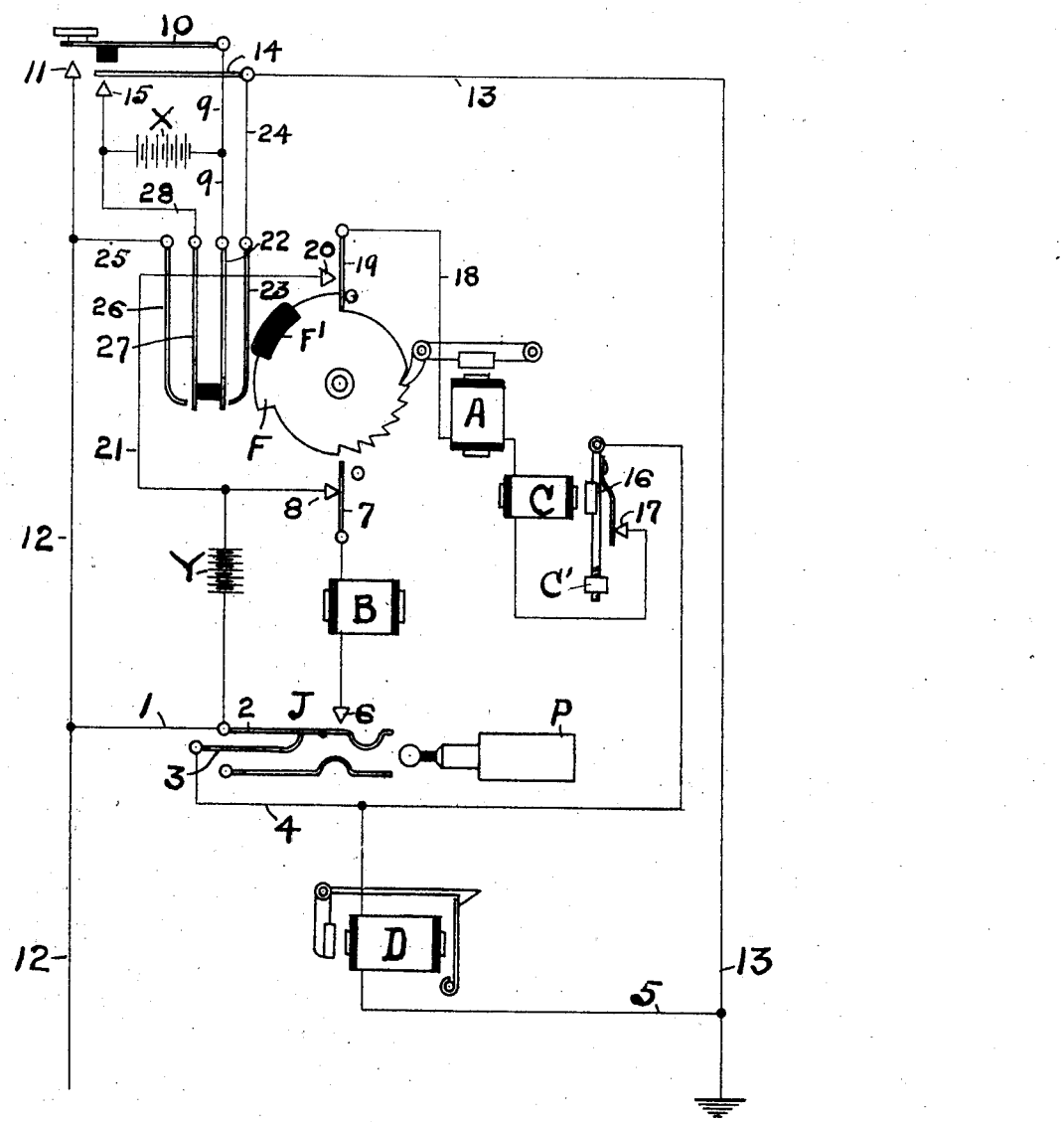
Witnesses
Thomas Hawkes
Howard A. Redfield
Inventors:—
Clarence A. Anderson
William Hagstrom
By their Attorney
Casper L. Redfield.

UNITED STATES PATENT OFFICE.

CLARENCE A. ANDERSON, OF SALINA, AND WILLIAM HAGSTROM, OF LINDSBORG, KANSAS, ASSIGNORS OF ONE-THIRD TO JOHN ANDERSON, OF SALINA, KANSAS.

AUTOMATIC RELEASE FOR PARTY-LINE EXCHANGES.

No. 832,946.      Specification of Letters Patent.      Patented Oct. 9, 1906.

Application filed February 8, 1905. Serial No. 244,754.

*To all whom it may concern:*

Be it known that we, CLARENCE A. ANDERSON, residing at Salina, Saline county, and WILLIAM HAGSTROM, residing at Lindsborg, McPherson county, Kansas, citizens of the United States of America, have invented certain new and useful Improvements in Automatic Release for Party-Line Exchanges, of which the following is a specification.

Our invention relates to releasing devices for party-line exchanges, and has for its object the provision of an automatic device so arranged as to prevent the forgetfulness of an operator tying up the line.

In party-line exchanges as very commonly made there is at each station a step-by-step mechanism provided with a magnet for operating. When the operator at the central office sends impulses in one direction over the line, they cause the step-by-step mechanisms to advance. When she sends an impulse in the opposite direction, it releases these mechanisms, so that they may return to their normal positions. When a subscriber sends a call to the central office, the operator inserts a plug in the jack for that line and then sends the proper impulses to make the desired selection. When the conversation is complete, she withdraws the plug, restores the drop, and sends a release impulse over the line. It sometimes happens that after withdrawing the plug and restoring the drop the operator forgets to send the release impulse. In such a case the subscribers on the line are locked out from calling the central office, and the operator is unconscious of the fact.

It is the object of our invention to supply an automatic releasing device so arranged that upon withdrawal of the plug the necessary releasing impulse will be automatically sent over the line. We accomplish this result by providing the central office with a simple step-by-step mechanism of any convenient form of construction. There is a propelling-magnet for advancing the mechanism to one extreme of its movement and a releasing-magnet for permitting it to return to its other extreme. The mechanical construction of this step-by-step mechanism is immaterial to the present case and may be any of the well-known forms. It is therefore shown in the accompanying drawing as a ratchet-wheel having the necessary magnets A and B adjacent thereto. Secured to the ratchet-wheel and moving therewith is a contact-operating body F, having a projection F'. At one extreme of its movement it breaks the circuit connections for the operating-magnet A and at the other extreme it breaks the connections for the release-magnet B. Between these two extremes the projection F' closes the connections to the main battery X, so as to send a release impulse over the line for the purpose of releasing the step-by-step mechanisms at the local stations.

In connection with the operating-magnet A there is a small make-and-break magnet C, whose office is to cause a series of impulses to flow through A, so as to cause an advance of the step-by-step mechanism. In addition to these there are a small battery Y, a jack J, a plug P, and a drop D, also some springs and connections which will be understood from the description. In place of the ordinary calling device a simple key is shown for the purpose of sending operating impulses over the line.

The drawing shows the central-office step-by-step mechanism in its normal position, which is the position of extreme advance. A subscriber on the line 12 in operating his generator to call central closes the connection between line 12 and ground. The circuit then is: 12, 1, 2, 3, 4, D, 5, ground. This operates the drop and calls central. The operator then inserts plug P in jack J, thus breaking connection between 2 and 3 and closing connection between 2 and 6. Upon this closure a current flows Y, 2, 6, B, 7, 8, Y. This current, through the magnet B, releases the step-by-step mechanism and permits it to move to its other extreme position in the manner well known in such mechanisms. In this position the circuit for B is broken at 7 8 and closed for the operating-magnet A at 19 20. This circuit, however, was previously broken at 2 3 by the insertion of the plug P in the jack J, and consequently this closure is without effect until the plug is removed. In this position the operator sends a required number of impulses over the line and through the sub-station devices in the ordinary manner. As far as the central-office devices are concerned she presses key 10, when the current flows—X, 9, 10, 11, 12 through the substation devices and return through ground, 13, 14, 15, X. When talking is finished the operator removes plug and restores drop. The removal of the plug breaks the circuit for B at 6 and closes it for A at 3. A current then flows: Y, 2, 3, 4, 16, 17, C, A, 18, 19, 20, 21, Y. This actuates A to move the mechanism one step forward and also actuates C to break the circuit just described. The armature 16 has a spring which connects to 17, so that the contact is not instantly broken. The armature also has on it an adjustable weight C', by means of which the speed of the make and break at 17 may be regulated to suit the operation of A in propelling the step-by-step mechanism. Upon the breaking of this circuit at 17 the armature falls back, again closing the circuit and again actuating A to advance the step-by-step mechanism. This is continued until the parts reach the position shown in the drawing, with the circuit for A broken at 19 20. During this movement the projection F' engages the adjacent springs, whereupon a current flows: X, 9, 22, 23, 24, 13, ground, to the substations and through their devices 12, 25, 26, 27, 28, X. This is an impulse in the opposite direction from those operating impulses sent by pressing key 10 and is what is required at the local stations for releasing their devices.

It is one of the requirements of the ordinary substation devices that the releasing impulse be prolonged sufficiently for the release to be complete. This is effected by making the projection F' long enough to hold the circuit closed through two or three steps of the mechanism operated by A. As this mechanism exists for no other purpose than to automatically send the substation releasing impulse at the proper time, the length of the projection F' may be anything necessary to accomplish this result, and the total length of movement need be no more than enough for F' to be clear of 23 at the two extremes of movement.

What we claim is—

1. In the central-office apparatus of a party-line exchange, a jack and plug for connecting a party-line to the central-office devices, a battery, and automatically-operating means for sending a prolonged releasing impulse over the line upon a withdrawal of the plug from the jack.

2. The combination with a party-line, a central office, and a jack and plug for making connections to the party-line, of a battery, means by which an operator at the central office may send a series of impulses in one direction from said battery over said line when the plug is in the jack, and automatically-operating means by which a prolonged impulse is sent in the opposite direction over the line when the plug is removed from the jack.

3. In the central-office devices of a party-line exchange, the combination with a jack and plug, and means for sending operating impulses over the line when the plug is inserted in the jack, of an electrically-operated device arranged upon actuation to send a releasing impulse over the line, and means for automatically starting said device into operation by removing the plug from its jack.

4. The combination with a party-line, central-office devices, and means for connecting and disconnecting the two, of means by which an operation of said devices when connected will send operating impulses over said line, and an automatically-operating mechanism so arranged that upon disconnecting said line from said devices said mechanism will cause a releasing impulse to be sent over said line.

5. In the central-office devices of a party-line exchange, a step-by-step mechanism arranged so that upon actuation it will cause a prolonged impulse to be sent over the party-line with which it is associated, and means by which upon an operator at the central office disconnecting a party-line the mechanism associated therewith will be automatically set into operation to cause the sending of such impulse.

6. In the central-office devices of a party-line exchange, the combination with a party-line, and a jack and plug therefor, of a step-by-step mechanism movable to either of two extreme positions, means by which upon the insertion of the plug in the jack said mechanism will be moved quickly to one extreme of its movement, means by which a withdrawal of the plug will cause a gradual return of the mechanism to the other extreme, and a contact-closing device operated by the intermediate part of the movement of said mechanism.

Signed at San Antonio, Texas, this 19th day of January, 1905.

CLARENCE A. ANDERSON.

Witnesses:
  W. H. LIPSCOMB,
  NAT B. JONES.

Signed at Lindsborg, Kansas, this 2d day of February, 1905.

WILLIAM HAGSTROM.

Witnesses:
  JOSEPH A. BRANDT,
  CARL L. HOLM.